United States Patent [19]

Watanabe

[11] Patent Number: 4,638,330

[45] Date of Patent: Jan. 20, 1987

[54] IMAGE FORMING APPARATUS

[75] Inventor: Junji Watanabe, Yokohama, Japan

[73] Assignee: Kabushiki Kaisha Toshiba, Kawasaki, Japan

[21] Appl. No.: 741,136

[22] Filed: Jun. 4, 1985

[30] Foreign Application Priority Data

Jun. 11, 1984 [JP] Japan ............................... 59-119515

[51] Int. Cl.[4] ............................................ G01D 15/10

[52] U.S. Cl. ............................... 346/76 PH; 346/106; 400/120; 400/240.4

[58] Field of Search ................ 346/76 PH, 76 R, 105, 346/106; 400/120, 240.3, 240.4, 224.2; 219/216 PH; 101/DIG. 7, 336

[56] References Cited

FOREIGN PATENT DOCUMENTS 57-8186 1/1982 Japan ............................ 346/76 PH 0173192 10/1982 Japan ............................... 400/240.3

*Primary Examiner*—Arthur G. Evans

*Attorney, Agent, or Firm*—Oblon, Fisher, Spivak, McClelland & Maier

[57] ABSTRACT

An image forming apparatus uses a transfer medium with a plurality of regions coated with different color inks and arranged in a row. The region of at least one color is different in size from the regions of other colors.

24 Claims, 20 Drawing Figures

IMAGE FORMING APPARATUS

BACKGROUND OF THE INVENTION

The present invention relates to an image forming apparatus for forming an image by transferring a color medium from a transfer medium to a sheet of paper in accordance with an image pattern.

Amont the known color image forming apparatuses of this type is a thermal head printer in which color media are melted by heat in accordance with an image pattern and then are transferred to a sheet of paper.

Small, low-priced, noise-free and capable of printing on ordinary paper, thermal head printers have recently been used as output devices of computers and word processors, and in copying apparatuses.

The thermal head printer uses a ribbon 2 shown in FIG. 1. Ribbon 2 has a yellow region 4, a magenta region 6, a cyan region 8 and a black region 10. These ink regions have the same width w and the same length l. To print a color image on a sheet of paper, first the yellow ink is transferred, then the magenta ink, the cyan ink and finally the black ink.

To print color images on sheets of different sizes, each ink region of ribbon 2 must be of the largest size. When color images are printed on sheets of a smaller size, that portion of each ink region which extends beyond the sheets is left unused. When ribbon 2 is large enough to print images on sheets of legal size (215.9 mm×355.6 mm) and images are printed on only sheets of letter size (215.9 mm×279.4 mm), the portion of each ink region, 214.9 mm long and 76.2 mm wide, is left unused. This is undesirable from an economical point of view.

SUMMARY OF THE INVENTION

Accordingly, the object of the present invention is to provide a color image forming apparatus which transfers each color media from every portion of a transfer medium, thus achieving an economical use of the transfer medium.

According to an aspect of the invention, there is provided an image forming apparatus which uses a transfer medium having a plurality of regions coated with different color inks and arranged in a row, the region of at least one color being larger than the regions of other colors.

DETAILED DESCRIPTION OF THE PREFERRED EMBODIMENT

One embodiment of the invention, i.e., a thermal head printer 10, will be described with reference to FIGS. 2–18.

Figure 1:
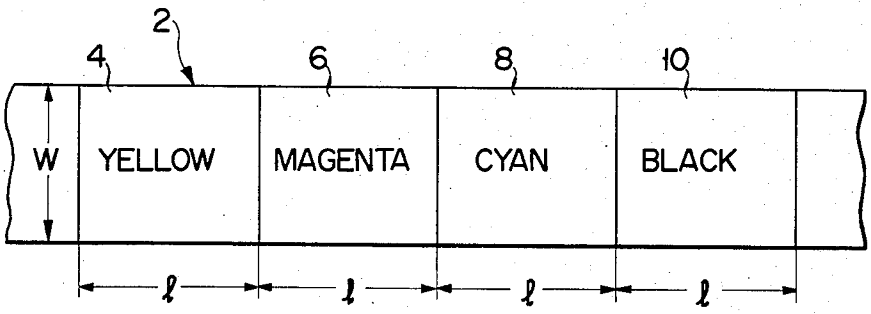
FIG. 1 PRIOR ART
FIG. 1 is a plan view of the ribbon used in the conventional thermal head printers.
Figure 2:
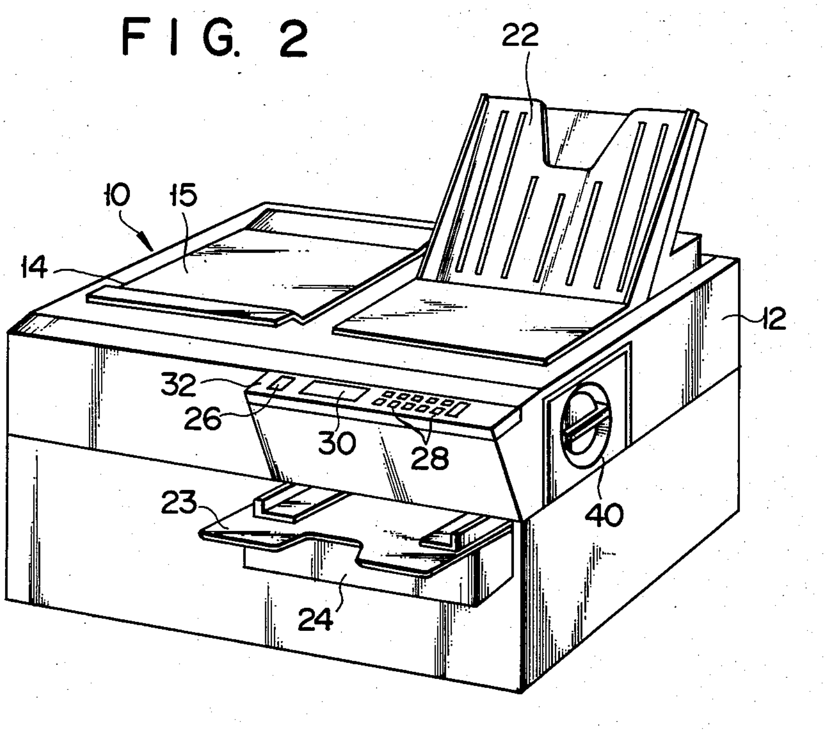
FIG. 2 is a perspective view of a thermal head printer according to the present invention.
Figure 3:
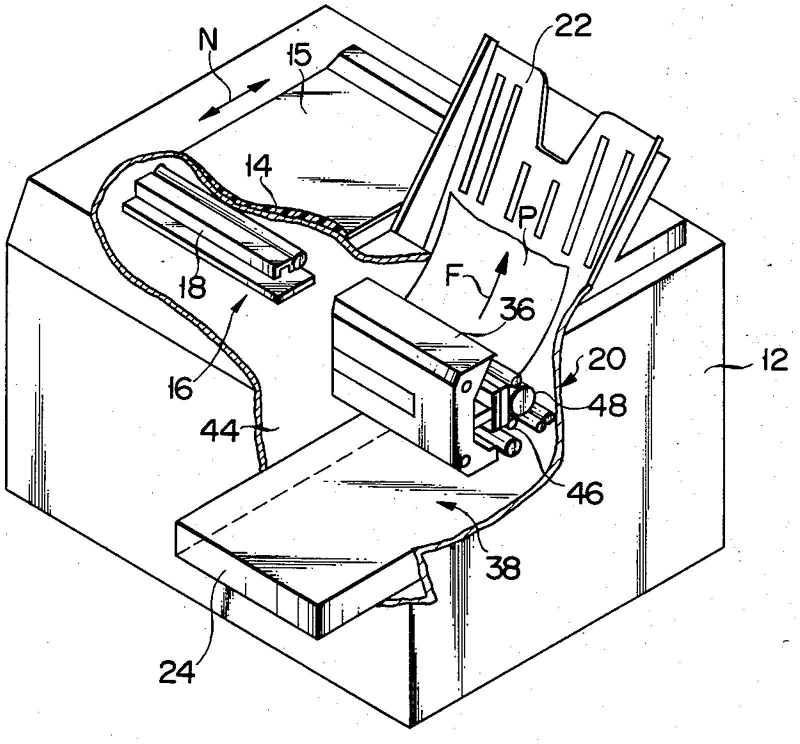
FIG. 3 is a cutaway, perspective view of the printing shown in FIG. 2.

As shown in FIGS. 2 and 3, printer 10 comprises a housing 12 and a document table 14 provided on the top of housing 12. Table 14 is a transparent plate, e.g., a glass plate. A cover 15 is provided to cover a document placed on table 14. A scanning section 16 is arranged below document table 14 to scan the document placed on table 14. Section 16 has an exposure system 18 which can move in the direction of arrow N to apply light onto the document. Section 16 can convert the information printed on the document into electrical signals. An ink transfer unit 20 is provided substantially at the center of housing 12 to print an image on a sheet P of paper according to the signals output by section 16.

A tray 22 extends upwardly from the top of housing 12 to receive a printed sheet P moving in the direction of arrow F. A paper cassette 24 is detachably inserted in a slot cut in the front wall of housing 12 to supply sheets P of paper to ink transfer unit 20. A manual feed guide 23 is detachably attached to the front wall of housing 12, right above paper cassette 24, to guide sheets P one by one to unit 20 as the operator feeds the sheets P by hand. An operation panel 32 with a start button 26, ten keys 28 and a display 30 is provided on the front portion of the top of housing 12. Display 30 can display the message "PAPER JAMMING" or the like.

Within housing 12, ink transfer unit 20 adjoins a ribbon cassette holding section 38 with a holder 42. Holder 42 holds a ribbon cassette 36 containing a roll of ribbon 34. Section 38 has a door 40 which is opened when cassette 36 is moved to holder 42 and is closed when cassette 36 is pulled from holder 42.

Ink transfer unit 20 is provided with a thermal head 46 having a plurality of heating elements arranged in a matrix. These elements are selectively energized by pattern signals supplied from unit 16 to heat that portion of ribbon 34 which is exposed from cassette 36, to thereby melt the color ink and transfer the same to a sheet P of paper. A platen 48 is arranged along thermal head 46, and ribbon 34 is placed in the gap between platen 48 and head 46. Head 46 can be moved to press ribbon 34 and sheet P onto platen 48 so that melted ink may be transferred from ribbon 34 to sheet P. A board 50 is provided at the back of thermal head 46 to radiate the heat generated by head 46.

Figure 4:
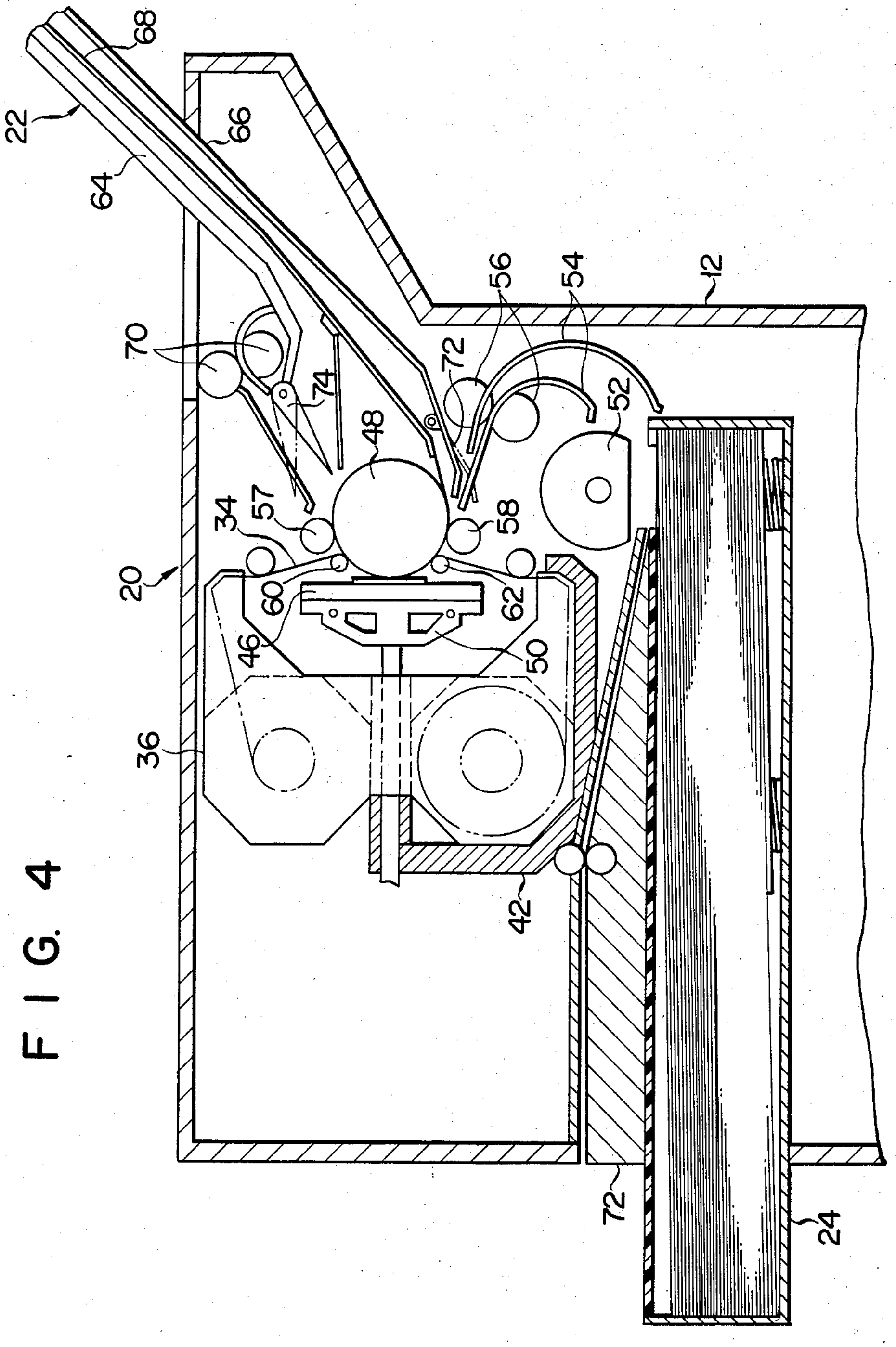
FIG. 4 is a longitudinal, sectional view of the printer shown in FIG. 2.

Ink transfer unit 20 will now be described in more detail with reference to FIG. 4. A sheet-feeding roller 52 is positioned above the front portion of cassette 24 to feed sheets P to the ink transfer position. A pair of guide plates 54 are provided near roller 52 to guide one sheet P at a time. A pair of resist rollers 56 are located near the distal ends of guide plates 54 to align the leading edge of sheet P with a reference point. Pressure rollers 57 and 58 vertically extend. They can be moved to contact platen 48 to convey sheet P from resist rollers 56 against platen 48 and to guide sheet P to the ink transfer position. A guide roller 60 is arranged between thermal head 46 and pressure roller 57, and another guide roller 62 is provided between head 46 and pressure roller 58.

Tray 22 comprises three plates 64, 66 and 68 formed integrally and extending upwardly from ink transfer unit 20. Plate 64 guides a printed sheet P upward, and plates 66 and 68 temporarily hold sheets P. A pair of discharge rollers 70 are arranged at the lower end of plate 64 to guide printed sheets P from ink transfer unit 20 to plate 64. Rollers 70 are coupled to tray 22, thus forming a unit detachable from housing 12.

A first selector guide 72 is pivotally mounted on the lower end portion of plate 66 and positioned between resist rollers 56, on the one hand, and platen 48, on the other, to select the direction in which printed sheet P is to be conveyed. Guide 72 guides sheet P from resist rollers 56 to platen 48 and, further from platen 48 to plate 66. A second selector guide 74 is pivotally mounted on the lower end portion of plate 68 and located between rollers 70, on the one hand, and platen 48, on the other, to guide sheet P to plate 64 and further to plate 68.

Figure 5:
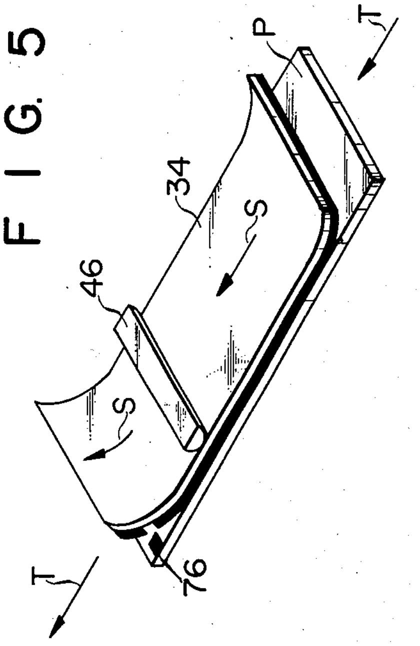
FIG. 5 illustrates how color media are transferred from a ribbon to a sheet of paper by the printer shown in FIG. 2.

With reference to FIG. 5, it will be described how color inks are transferred from a ribbon to a sheet P of paper, thereby printing a color image on the sheet P. The ink 76 coated on ribbon 34 is melted by the heat generated by thermal head 46 and is transferred to sheet P. During the thermal transfer printing, ribbon 34 and sheet P are simultaneously moved in the directions of arrows S and T.

Figure 6:
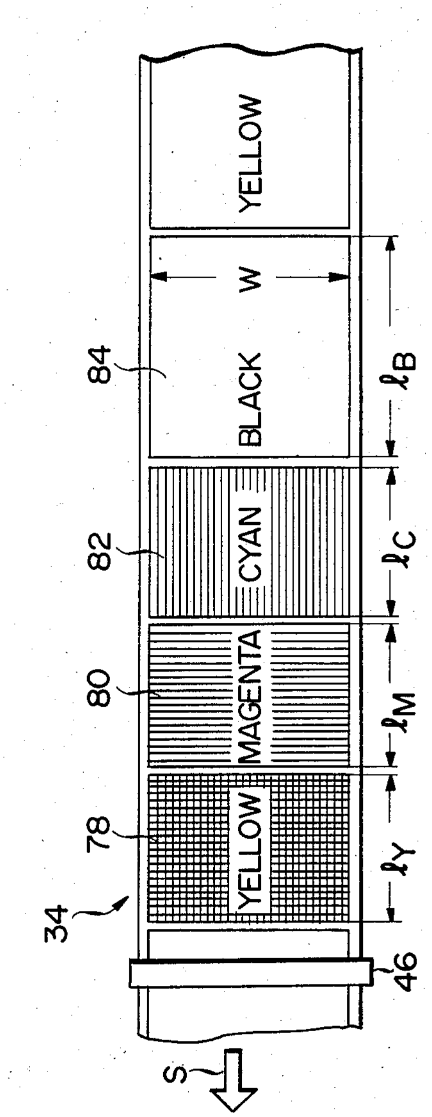
FIG. 6 is a plan view of the ribbon used in the printer of FIG. 1.

As shown in FIG. 6, ribbon 34 has a yellow region 78, a magenta region 80, a cyan region 82 and a black region 84, arranged side by side. Each ink region is separated from adjacent regions by a no-ink region about 5 mm wide. These ink regions have the same width w, i.e., 8.5" (=215.9 mm). Regions 78, 80 and 82 have the same length of 11" (=279.4 mm), while black region 84 has a length of 14" (=355.6 mm). Hence, the yellow, magenta and cyan regions have letter size, whereas the black region has legal size. This makes an economical use of ribbon possible since in most cases, color images are printed on sheets of letter size and characters are printed on sheets of legal size.

With reference to FIGS. 7 to 10, it will be explained how ink transfer unit 20 transfers colored inks from the ribbon to a sheet P of paper.

Figure 7:
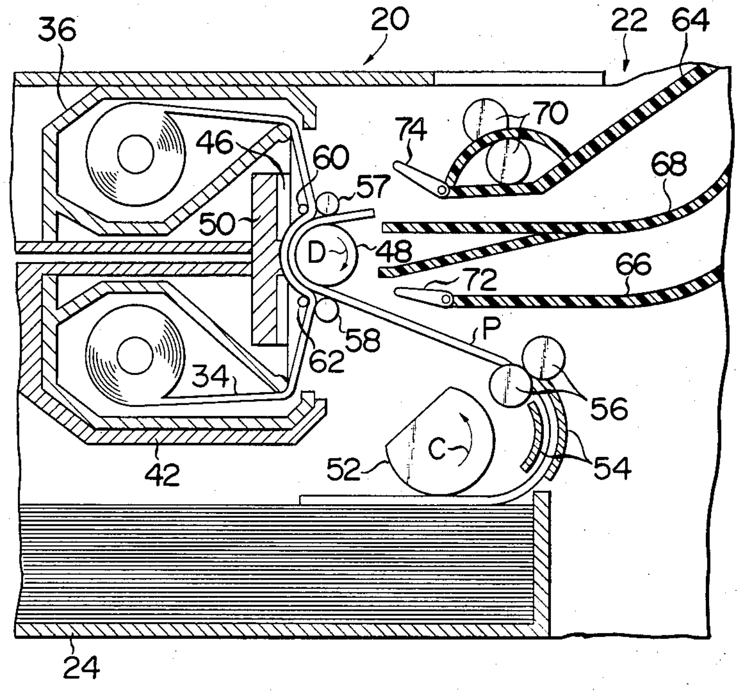
FIGS. 7 to 10 are sectional views of the printer, showing how the printer of FIG. 2 transfers ink media from the ribbon to a sheet of paper.

As shown in FIG. 7, when sheet-feeding roller 52 is rotated in the direction of arrow C, sheet P is taken from cassette 24. This sheet is guided by guide plate 54 to resist rollers 56. The leading edge of sheet P is aligned by rollers 56 and is conveyed by rollers 56 to platen 48. Since platen 48 is rotated in the direction of arrow D, sheet P is fed around platen 48 until it opposes ribbon 34. Thermal head 46 transfers the yellow ink from the region 78 of ribbon 34 to sheet P, thus printing a yellow image on sheet P, in response to the signals supplied from exposure system 18.

Figure 8:
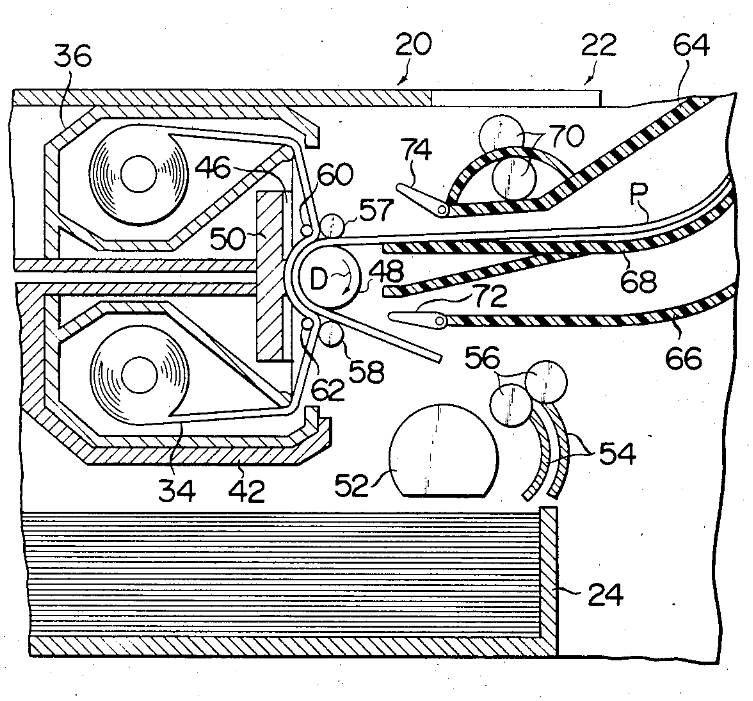
Figure 9:
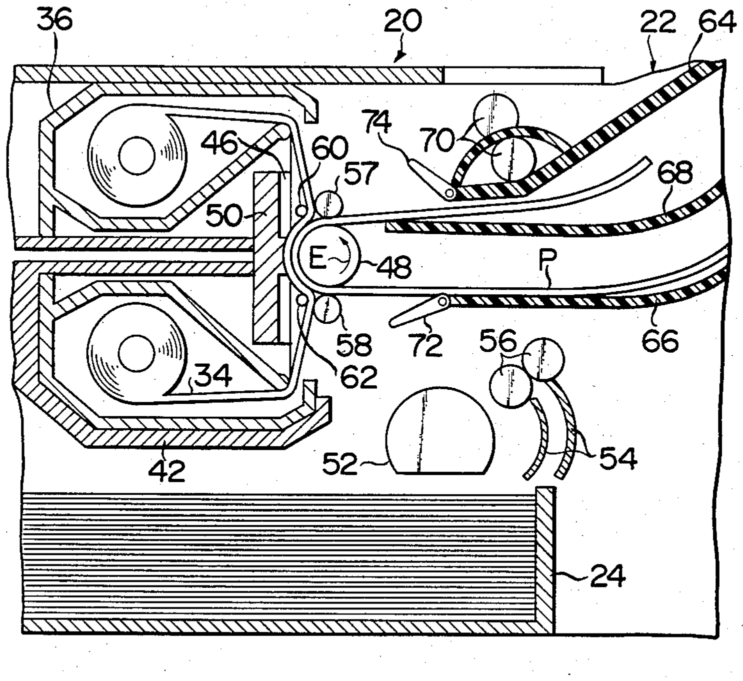
Figure 10:
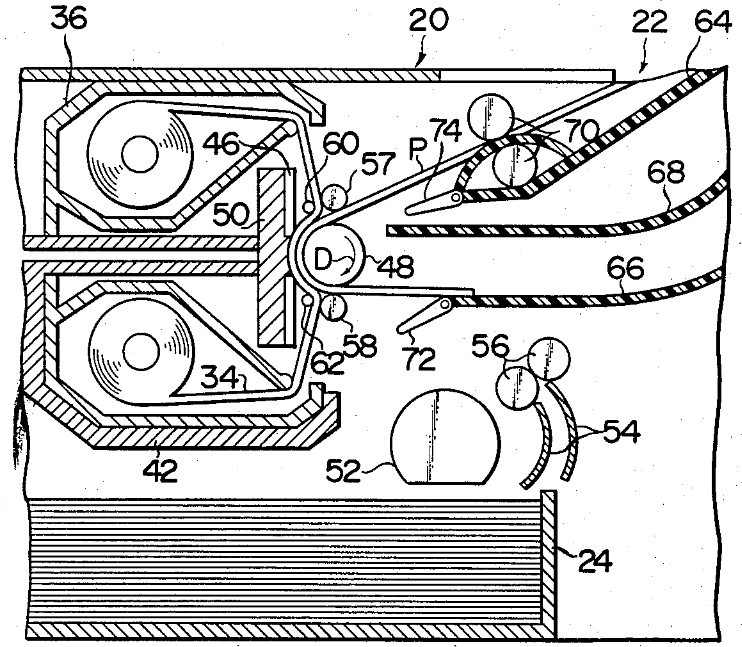
Figure 11:
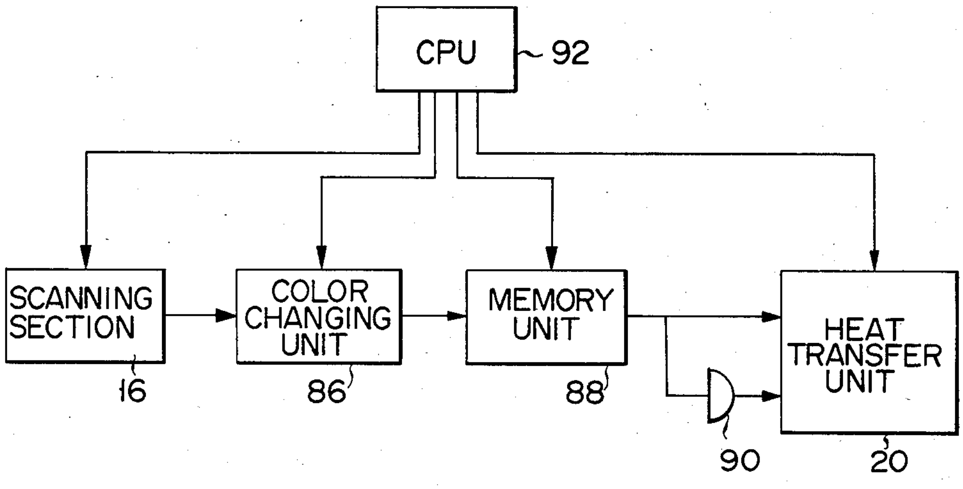
FIG. 11 is a block diagram showing the control system of the printer shown in FIG. 2.

Then, as shown in FIG. 8, second selector guide 74 is moved up, thus guiding sheet P to plate 68. As shown in FIG. 9, first selector guide 72 is pivoted downward when sheet P rests on plate 68, except for the rear edge portion pinched between ribbon 34 and platen 48. Platen 48 is then rotated in the direction of arrow E, pulling sheet P from plate 68 and conveying the same to plate 66. Since first selector guide 72 is below plate 68, sheet P is smoothly guided on plate 66. When the entire sheet P, except the front edge portion pinched between ribbon 34 and platen 48, is put on plate 66, the platen is rotated again in the direction of arrow D as shown in FIG. 10. In the meantime, ribbon 34 is moved to the left (FIG. 6), bringing magenta region 80 to the ink transfer position. As sheet P is conveyed around platen 48, thermal head 46 transfers, transferring the magenta ink from region 80 to sheet P, thus printing an image in magenta ink, superposing the yellow image, in response to the signals supplied from exposure system 18.

The sequence of operations described in the preceding paragraph is repeated, thereby printing an image in cyan ink, superposing the yellow image and the magenta-ink image. As a result, a color image is formed on sheet P. Sheet P with the color image is discharged onto plate 64.

Thermal printer 10 has a control system for controlling ink transfer unit 20. This system comprises a color changing unit 86, a memory unit 88 and a CPU 92. Units 86 and 88 are arranged between scanning section 16 and ink transfer unit 20. Unit 86 is connected to unit 16 and memory unit 88. Color component signals, i.e., yellow, magenta, and cyan signals, are supplied from unit 16 to color changing unit 86. Memory unit 88 is connected to ink transfer unit 20. It stores position data showing the positions of the picture elements of the image formed on the document. Unit 20 transfers the color inks from ribbon 34 to sheet P in accordance with the color component signals and the position data. An AND gate 90 is connected between unit 20 and memory unit 88 so as to generate a black signal when yellow, magenta and cyan signals are supplied to it.

Scanning section 16, color changing unit 86, memory unit 88 and ink transfer unit 20 are coupled to CPU 92. CPU 92 controls scanning section 16 and units 20, 86 and 88 and determines the timing of signal generation in this section and these units.

Holder 42, thermal head 46, platen 48, guide rollers 60, rollers 62 and pressure rollers 57 and 58 constitute a holder unit 94. Holder unit 94 will be described with reference to FIGS. 12 to 15.

Holder 42 is die-cast or made of plastic. It has a substantially C-shaped cross section and is relatively strong. Holder 42 holds ribbon cassette 36, thus surrounding part of cassette 36, when cassette 36 is put on it. THe inner wall of cassette 36 is supported by support members 96 and 98 both provided in the vicinity of the exposed portion of ribbon 34 and extending in parallel to the axis of platen 48. A support portion 104 is formed between members 96 and 98 to support and guide thermal head 46. Head 46 is coupled to a head drive mechanism and can move between the ink transfer position indicated by solid lines in FIG. 12 and the non-transfer position indicated by broken lines.

Figure 13:
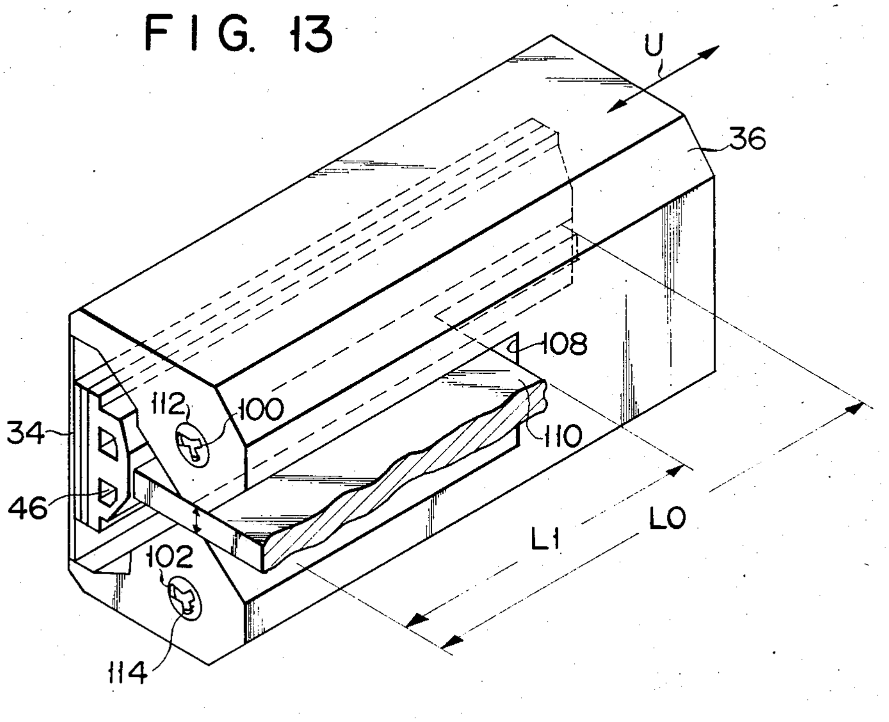
FIG. 13 illustrates how a ribbon cassette is mounted on the winding mechanism of a cassette mounting section.
Figure 12:
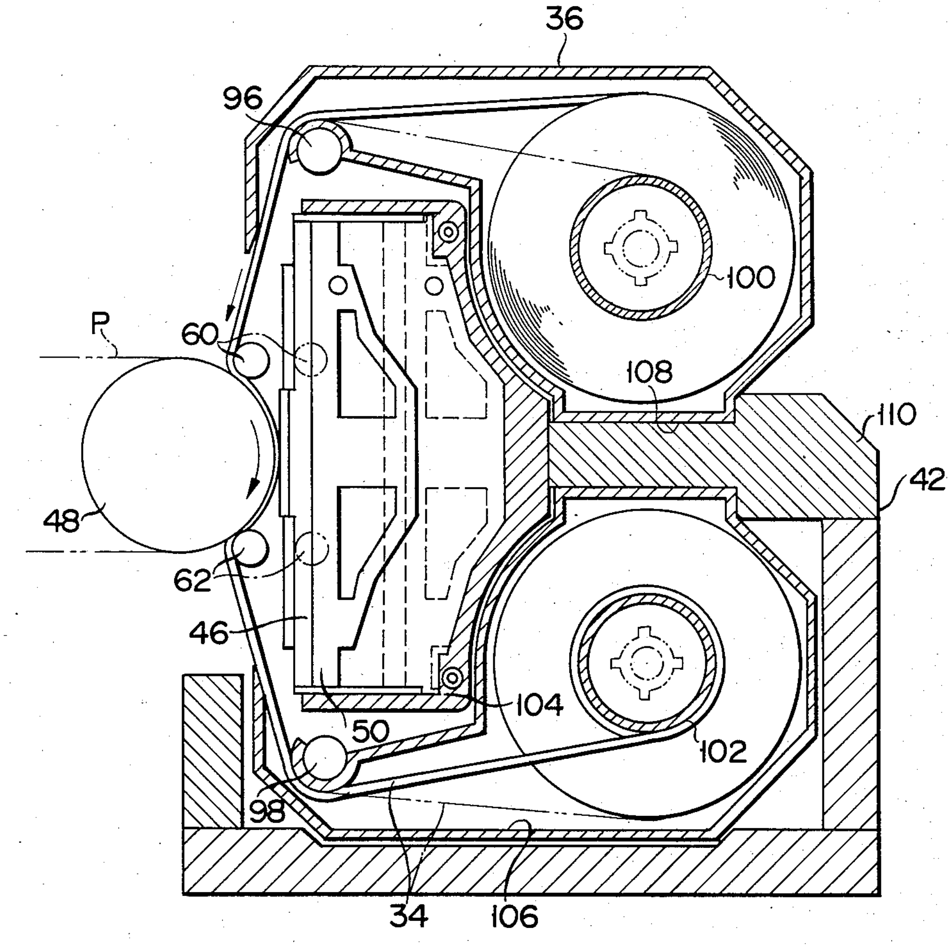
FIG. 12 is a sectional view of the transfer unit used in the printer of FIG. 2.

Ribbon cassette 36 has two reels 100 and 102. The end portions of ribbon 34 are wound around reels 100 and 102, respectively. Reels 100 and 102 are put in a case 106. As shown in FIG. 13, a slit 108 is cut in case 106. A frame block 110 extends through this slit and also through the gap between reels 100 and 102. Slit 108 has a length L1. It is desired that length L1 be given as: L1>L0/2, where L0 is the width of case 106. In this embodiment, L1=2L0/3. Slit 108 has a width t which is substantially equal to the thickness of the frame block. Hence, the ribbon cassette 36 is supported over two thirds of its length by frame block 110; it is accurately and readily held in position when mounted on holder 42.

As shown in FIG. 13, a notch 112 is cut in one end of reel 100, and a notch 114 is cut in one end of reel 102. Couplings 116 and 118 can be inserted into notches 112 and 114. Ribbon cassette 36 is attached to, or detached from, holder 42 in the direction of arrow U.

Figure 14:
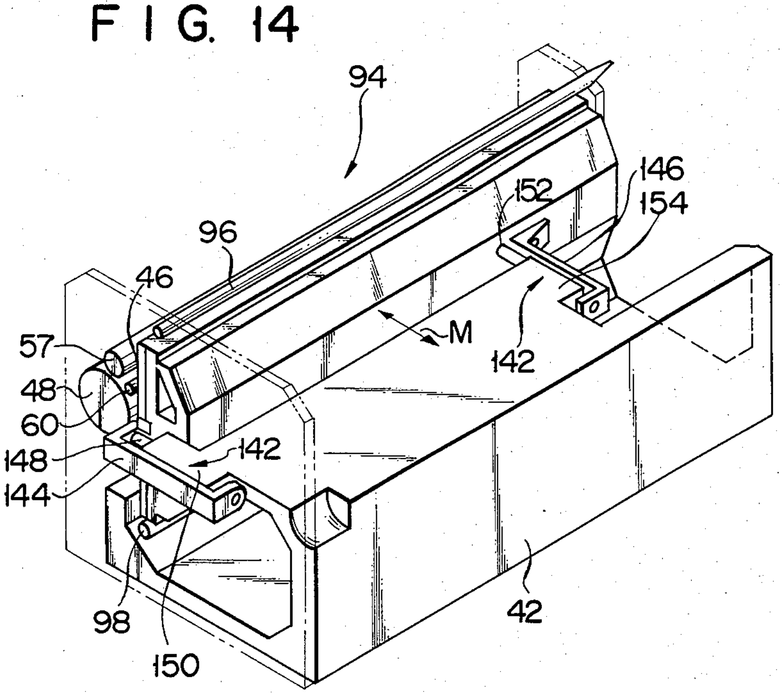
FIG. 14 is a perspective view of the part of the transfer unit shown in FIG. 4.
Figure 15:
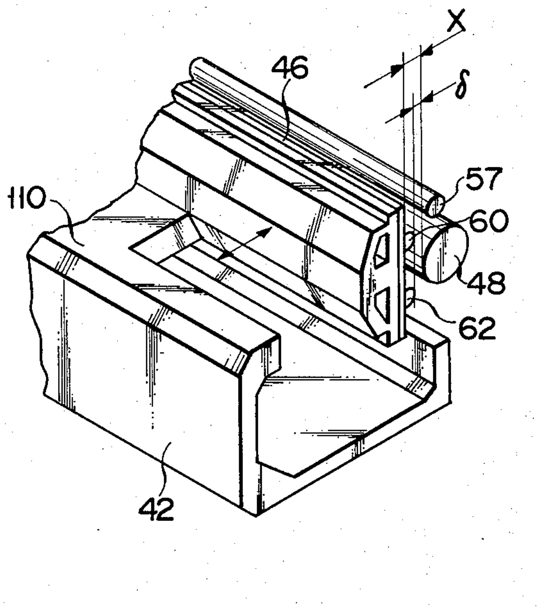
FIG. 15 is a perspective view of the transfer unit and a mechanism for driving the transfer unit.

As shown in FIG. 14, thermal head 46 and holder 42 are coupled by a sliding mechanism 142 and can slide relative to each other. Mechanism 142 has two stays 144 and 146. A guide shaft 148 is secured to one end of stay 144 and supported by a projection 150 protruding from one end of frame block 110. A linear bearing (not shown) is embedded in projection 150 to help head 46 move smoothly in the direction of arrow M. A guide shaft 152 is secured to one of stay 146 and is supported by a projection 154 protruding from the other end of frame block 110. A linear bearing (not shown) is embedded in projection 154 to help head 46 move smoothly in the direction of arrow M. Rollers 60 and 62 are formed integrally with head 46. Therefore, when head 46 moves from the ink transfer position R to the non-transfer position for a distance X as shown in FIG. 15, rollers 60 and 62 also move for the same distance. While ribbon cassette 36 is being mounted, rollers 60 and 62 and head 46 can move for a distance δ from platen 48. This distance δ is long enough to facilitate the insertion of ribbon 34 into the gap between head 46 and platen 48.

Figure 16:
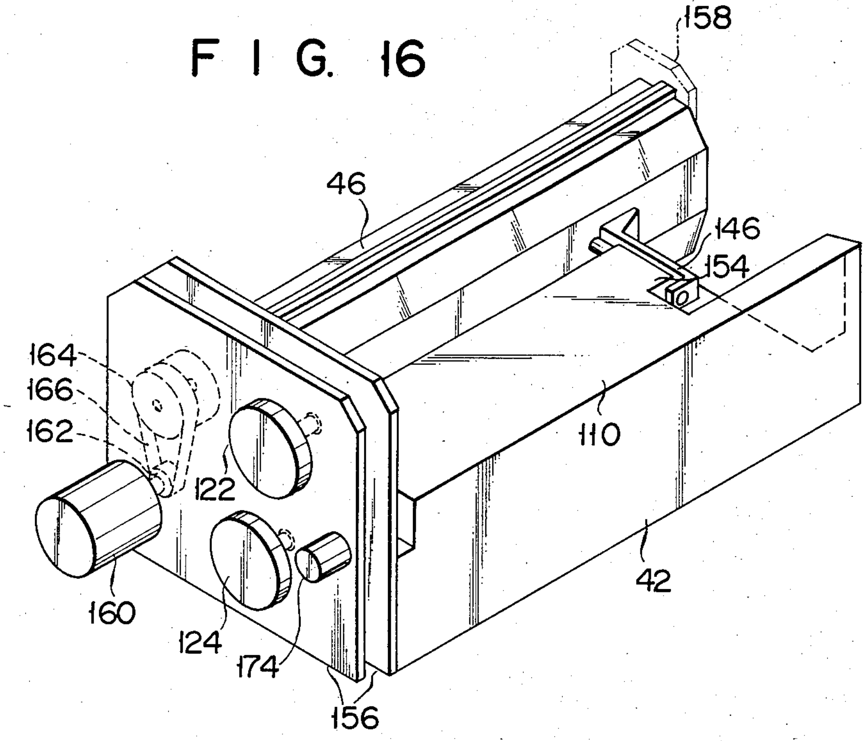
FIG. 16 is another perspective view of the transfer unit and the mechanism for drivng this unit.
Figure 17:
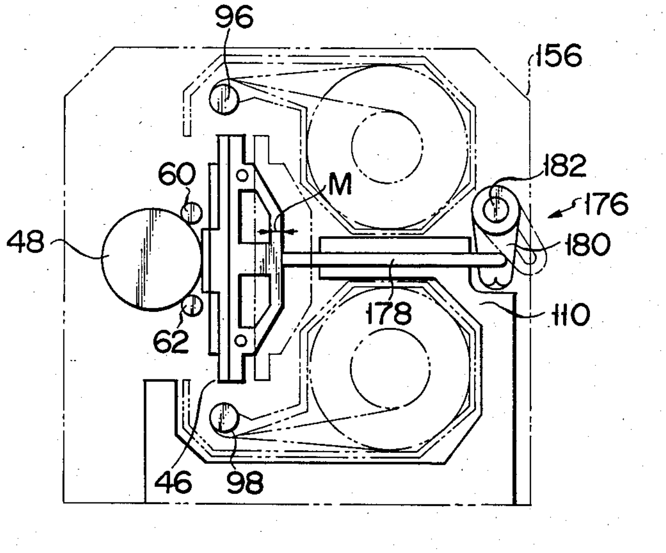
FIG. 17 is a side view of a mechanism for driving the thermal head shown in FIG. 4.

As shown in FIGS. 16 and 17, the end portions of platen 46 are rotatably supported on the end portions of holder 42 by supports 156 and 158 each consisting of two parallel plates. Provided outside support 156 is a reversible motor 160, i.e., a pulse motor, for driving platen 48. A pulley 162 is mounted on the shaft of motor 160, and a pulley 164 is coaxially attached to platen 48. A belt 166 is wrapped around pulleys 162 and 164, so that platen 48 is rotated when motor 160 rotates. Two motors 122 and 124 are mounted on the outer plate of support 156 to feed ribbon 34 loaded in cassette 36. A motor 174 is also mounted on this plate to move thermal head 46.

As shown in FIG. 17, motor 174 is coupled to a mechanism 176 for moving head 46. A rod 178 is slidably inserted in frame block 110. One end portion of this rod is slidably inserted in frame block 110 and coupled to the back of thermal head 46. The other end portion of rod 178 is coupled to one end of a rocking arm 180. The other end portion of arm 180 is supported by a pivot 182. The shaft of motor 174 is coaxially coupled to one end of pivot 182. Head 46 can therefore move in a straightline in the direction of arrow M (FIG. 14).

Figure 18:
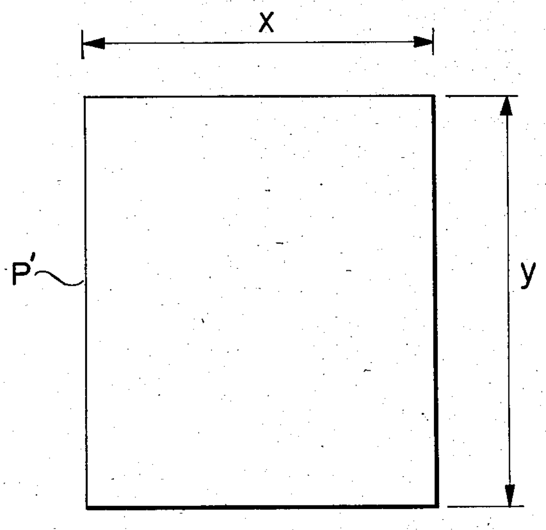
FIG. 18 is a plan view of the letter-size sheet of paper used in printing a color picture by the printer.
Figure 19:
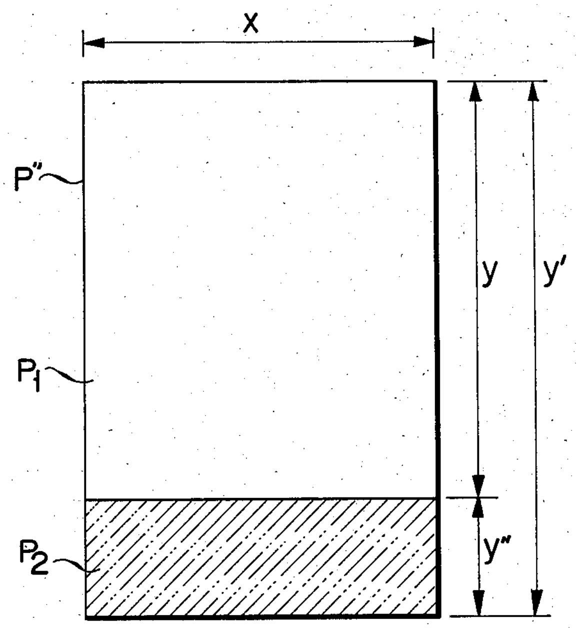
FIG. 19 is also a plan view of the legal-size sheet of paper used in printing a color picture by the printer.

FIG. 18 shows a sheet P′ of letter size (215.9 mm×279.4 mm), and FIG. 19 shows a sheet P″ of legal size (215.9 mm×355.6 mm). Thermal transfer printer according to the invention can print images and/or characters on sheets P′ and P″. Sheet P″ is 76.2 mm longer than sheet P′, but has the same width (215.9 mm) as the sheet P′. In most cases, sheets P″ are used for official documents, and standardized sentences are printed on the upper and/or lower portion of each sheet P″. Hence, it does not matter that yellow region 78, magenta region 80 and cyan region 82 of ribbon 34 have letter size while black region 84 has legal size. That is, characters can be printed on the entire surface, i.e., region P1 (letter size) plus region P2 (215.9 mm×76.2 mm), using black region 84, while a color image can be printed on region P1, using color ink regions 78, 80 and 82.

To print a document consisting of letter-size sheet P′ and legal-size sheets P″, sentences may be printed on sheets P″, using black region 84 of ribbon 34, and graphs and tables may be printed on sheets P′, using color regions 78, 80 and 82.

The present invention is not limited to the embodiment described above. Various changes and modifications are possible within the scope of the invention. Sheets of B5 size (7.17″×10.12″) and sheets of A4 size (8.27″×11.69″) may be used. Alternatively, sheets of government letter size (8.0″×10.5″) and sheets of government legal size (8.0″×13″) may be used. In either case, the black region of the ribbon has the larger size, and the color ink regions have the smaller size. Moreover, when any color ink region is more frequently used than the black region, this color ink region may have the larger size than the other color ink regions and the black region.

Further, two or three of the ink regions of the ribbon may have a size larger than the other ink regions.

Figure 20:
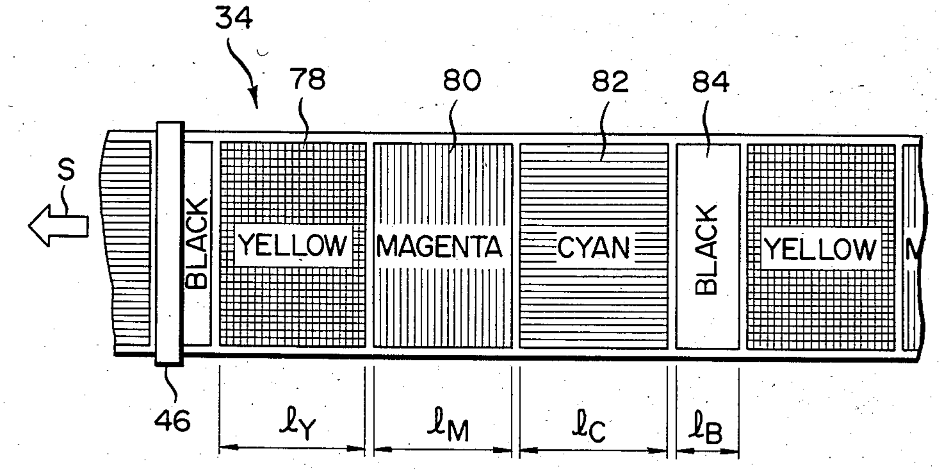
FIG. 20 is a plan view of the ribbon used in another embodiment of the invention.

Still further, the black region of the ribbon may be smaller than the other ink regions, as illustrated in FIG. 20. That is, the black region may be 215.9 mm wide and 76.2 mm long, whereas the cyan, yellow and magenta regions have letter size. The ribbon shown in FIG. 20 can be economically used when standardized sentences are printed in the lower end portion P2 (FIG. 19) of sheets of legal size P″. Instead of the black region, any other ink region may be 215.9 mm wide and 76.2 mm long. Further, the small ink region may have any other size than 215.9 mm×76.2 mm, e.g., the difference between legal size and A4 size or the difference between two other paper sizes.

What is claimed is:

1. An image forming apparatus employing image-forming signals for forming an image on a sheet, comprising:

a transfer medium having four regions coated with ink arranged serially along the length of said transfer medium, said four regions respectively comprising coatings of yellow, magenta, cyan and black inks, said yellow, magenta and cyan ink regions having substantially the same sizes, said black ink region being different in size from each of said three other regions;

holding means for holding said transfer medium; and image forming means for forming an image by applying said cyan, magenta and yellow inks one over another in accordance with color signals representing a color image and for transferring black ink in response to a black-color signal.

2. An apparatus as claimed in claim 1, wherein the size of said black ink region is greater than the size of any of said yellow, magenta or cyan ink regions.

3. An apparatus as claimed in claim 2, wherein the size of said black ink region is substantially equal to the size of legal-size paper and the size of each of said yellow, magenta and cyan ink regions is substantially equal to the size of letter-size paper.

4. An apparatus as claimed in claim 1, wherein the size of said black ink region is less than the size of any of said yellow, magenta or cyan ink regions.

5. An apparatus as claimed in claim 4, wherein the size of each of said yellow, magenta and cyan ink regions is substantially equal to the size of legal-size paper and the size of said black ink region is substantially equal to the difference between the sizes of legal-size paper and letter-size paper.

6. A line printer responsive to image-forming signals to form an image on a sheet, comprising:

a transfer medium having regions coated with different color inks arranged serially along the length of said transfer medium, there being a region of black ink that is different in size from the other regions, said regions including yellow, magenta and cyan ink regions of substantially the same sizes;

holding means for holding said transfer medium; and head means extending transversely of said transfer medium for transferring said yellow, magenta and cyan inks, one over the other, from said transfer medium to the sheet in accordance with color signals representing a color image and for transferring black ink in response to a black-color signal, said head means comprising means for accomplishing said transferring on a line-by-line basis in accordance with the image-forming signals.

7. An apparatus as claimed in claim 6, wherein the size of said black ink region is greater than the size of any of said yellow, magenta or cyan ink regions.

8. An apparatus as claimed in claim 7, wherein the size of said black ink region is substantially equal to the size of a larger first size of paper and the size of each of said yellow, magenta and cyan ink regions is substantially equal to the size of a smaller second size of paper.

9. An apparatus as claimed in claim 6, wherein the size of said black ink region is less than the size of any of said yellow, magenta or cyan ink regions.

10. An apparatus as claimed in claim 9, wherein the size of each of said yellow, magenta and cyan ink regions is substantially equal to the size of a larger first size of paper and the size of said black ink region is substantially equal to the difference between the sizes of said first size of paper and a smaller second size of paper.

11. An image forming apparatus for forming an image on a sheet, comprising a transfer apparatus for transferring a color agent to the sheet in accordance with a latent image to form an image on the sheet and a transfer material feeding device receivable by said transfer apparatus, said transfer material feeding device comprising:

a transfer material in the form of a sheet having two ends;

said color agent being coated on said transfer material and comprising four regions arranged serially along said transfer material, said four regions respectively comprising yellow, magenta, cyan and black inks, said yellow, magenta and cyan ink regions having substantially the same sizes, said black ink region being different in size from each of the other three regions;

a pair of roll shafts respectively windingly engaging said two ends of said transfer material, wherein said transfer material may be fed therebetween, a case integrally enclosing said pair of roll shafts and said transfer material, said case having an opening on one side thereof for exposing a portion of said transfer material disposed between said roll shafts, wherein said transfer apparatus comprises a holder and said case further comprises a slit in a surface thereof other than said one side, said slit and said holder comprising means for guiding said transfer material feeding device onto said holder to be held thereby when said transfer material feeding device is set in said transfer apparatus; and image forming means for forming an image by applying said cyan, magenta and yellow inks one over another in accordance with color signals representing a color image and for transferring black ink in response to a black-color signal.

12. An apparatus as claimed in claim 11, wherein the size of said black ink region is greater than the size of any of said yellow, magenta or cyan ink regions.

13. An apparatus as claimed in claim 12, wherein the size of said black ink region is substantially equal to the size of a larger first size of paper and the size of each of said yellow, magenta and cyan ink regions is substantially equal to the size of a smaller second size of paper.

14. An apparatus as claimed in claim 11, wherein the size of said black ink region is less than the size of any said yellow, magenta or cyan ink regions.

15. An apparatus as claimed in claim 14, wherein the size of each of said yellow, magenta and cyan ink regions is substantially equal to the size of a larger first size of paper and the size of said black ink region is substantially equal to the different between the sizes of said first size of paper and a smaller second size of paper.

16. In combination:

an ink ribbon comprising a continuous medium and discrete regions of ink arranged serially along the length of said continuous medium, each region being spaced from its neighboring regions at substantially equal distances, there being groups of said regions repeatingly spaced along said continuous medium, each said group comprising regions of yellow, magenta, cyan and black inks, the size of one region in each group being different from the size of at least one other region in said group; and an image forming apparatus responsive to image-forming signals for forming a multi-color image on a sheet, said apparatus comprising holding means for holding said ink ribbon and ink transfer means for forming an image by applying said cyan, magenta and yellow inks, one over the other, to the sheet to form an image in accordance with color signals representing a color image and for transferring black ink in response to a black-color signal.

17. The combination of claim 16, wherein said apparatus comprises means for:

transferring said yellow, magenta and cyan inks to cover an area equal to substantially all of a face of a sheet of a smaller, first size of paper;

transferring said yellow, magenta and cyan inks to cover the same area of a face of a second, larger size of paper;

transferring said black ink to cover substantially all of a face of a sheet of said first size of paper; and transferring said black ink to cover substantially all of a face of a sheet of said second size of paper.

18. The combination of claim 16, wherein said apparatus comprises means for:

transferring said yellow, magenta and cyan inks to cover an area to substantially all of a face of a sheet of a smaller, first size of paper;

transferring said yellow, magenta and cyan inks to cover the same area of a face of a second, larger size of paper;

transferring said black ink to cover an area substantially equal to the difference between the sizes of said first and second sizes.

19. Apparatus as claimed in claim 2, wherein said apparatus comprises means for:

transferring said yellow, magenta and cyan inks to cover an area equal to substantialy all of a face of a sheet of a smaller, first size of paper;

transferring said yellow, magenta and cyan inks to cover the same area of a face of a second, larger size of paper;

transferring said black ink to cover substantially all of a face of a sheet of said first size of paper; and transferring said black ink to cover substantially all of a face of a sheet of said second size of paper.

20. Apparatus as claimed in claim 4, wherein said apparatus comprises means for:

transferring said yellow, magenta and cyan inks to cover an area equal to substantialy all of a face of a sheet of a smaller, first size of paper;

transferring said yellow, magenta and cyan inks to cover the same area of a face of a second, larger size of paper;

transferring said black ink to cover an area substantially equal to the difference between the sizes of said first and second sizes.

21. Apparatus as claimed in claim 7, wherein said apparatus comprises means for:

transferring said yellow, magenta and cyan inks to cover an area equal to substantialy all of a face of a sheet of a smaller, first size of paper;

transferring said yellow, magenta and cyan inks to cover the same area of a face of a second, larger size of paper;

transferring said black ink to cover substantially all of a face of a sheet of said first size of paper; and transferring said black ink to cover substantially all of a face of a sheet of said second size of paper.

22. Apparatus as claimed in claim 9, wherein said apparatus comprises means for:

transferring said yellow, magenta and cyan inks to cover an area equal to substantialy all of a face of a sheet of a smaller, first size of paper;

transferring said yellow, magenta and cyan inks to cover the same area of a face of a second, larger size of paper;

transferring said black ink to cover an area substantially equal to the difference between the sizes of said first and second sizes.

23. Apparatus as claimed in claim 12, wherein said apparatus comprises means for:

transferring said yellow, magenta and cyan inks to cover an area equal to substantialy all of a face of a sheet of a smaller, first size of paper;

transferring said yellow, magenta and cyan inks to cover the same area of a face of a second, larger size of paper;

transferring said black ink to cover substantially all of a face of a sheet of said first size of paper; and transferring said black ink to cover substantially all of a face of a sheet of said second size of paper.

24. Apparatus as claimed in claim 14, wherein said apparatus comprises means for:

transferring said yellow, magenta and cyan inks to cover an area equal to substantialy all of a face of a sheet of a smaller, first size of paper;

transferring said yellow, magenta and cyan inks to cover the same area of a face of a second, larger size of paper;

transferring said black ink to cover an area substantially equal to the difference between the sizes of said first and second sizes.

* * * * *